United States Patent
Lekontsev et al.

(10) Patent No.: US 10,237,728 B2
(45) Date of Patent: Mar. 19, 2019

(54) METHOD FOR WIRELESS DEVICE LABELING AND MACHINE READABLE MEDIUM FOR IMPLEMENTATION THEREOF

(71) Applicant: "WI-FI GUIDE" LIMITED LIABILITY COMPANY, Naberezhnye Chelny (RU)

(72) Inventors: Igor Sergeevich Lekontsev, Perm (RU); Ilnar Gabdelahatovich Samigullin, Naberezhnye Chelny (RU); Denis Ravilovich Minnetdinov, Naberezhnye Chelny (RU); Aleksei Viktorovich Golubev, Perm (RU)

(73) Assignee: Social IT Innovations Fund, Moscow (RU)

( * ) Notice: Subject to any disclaimer, the term of this patent is extended or adjusted under 35 U.S.C. 154(b) by 98 days.

(21) Appl. No.: 15/110,227

(22) PCT Filed: Jan. 14, 2015

(86) PCT No.: PCT/RU2015/000007
§ 371 (c)(1),
(2) Date: Jul. 7, 2016

(87) PCT Pub. No.: WO2015/108447
PCT Pub. Date: Jul. 23, 2015

(65) Prior Publication Data
US 2016/0337846 A1    Nov. 17, 2016

(30) Foreign Application Priority Data
Jan. 16, 2014   (RU) ................................ 2014101241

(51) Int. Cl.
| | | |
|---|---|---|
| H04W 8/26 | (2009.01) | |
| H04W 4/02 | (2018.01) | |
| H04W 8/22 | (2009.01) | |
| G06F 17/30 | (2006.01) | |
| H04W 12/06 | (2009.01) | |
| H04W 4/18 | (2009.01) | |
| H04W 4/12 | (2009.01) | |
| H04L 29/12 | (2006.01) | |
| G06Q 30/02 | (2012.01) | |
| H04W 84/12 | (2009.01) | |

(52) U.S. Cl.
CPC .............. *H04W 8/26* (2013.01); *G06F 17/30* (2013.01); *G06F 17/30876* (2013.01); *H04W 4/02* (2013.01); *H04W 4/185* (2013.01); *H04W 8/22* (2013.01); *H04W 12/06* (2013.01); *G06Q 30/0267* (2013.01); *H04L 61/00* (2013.01); *H04W 4/12* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2003/0198346 A1 | 10/2003 | Meifu et al. | |
| 2012/0047215 A1 | 2/2012 | Asthana et al. | |
| 2012/0293465 A1* | 11/2012 | Nandu | H04W 4/60 345/204 |
| 2015/0077155 A1* | 3/2015 | Clausen | F03D 11/0091 324/765.01 |
| 2016/0210699 A1* | 7/2016 | Meoli | H04L 67/42 |
| 2016/0242028 A1* | 8/2016 | Cho | H04L 67/02 |

FOREIGN PATENT DOCUMENTS

| | | |
|---|---|---|
| CN | 102036227 | 4/2011 |
| CN | 103118326 | 5/2013 |
| RU | 2010130543 | 1/2012 |
| RU | 119549 | 8/2012 |
| RU | 2461145 | 9/2012 |

* cited by examiner

*Primary Examiner* — Joshua Joo
(74) *Attorney, Agent, or Firm* — Aleksandr Smushkovich

(57) ABSTRACT

A system for designating a wireless communication device (WCD), a method of identifying a WCD, a system for identifying users of WCD in local zones, and machine-readable carriers enabling implementation of the aforementioned methods are proposed. The method identifying WCD includes steps of accepting network packets containing device identifiers (DIs), determining DIs, checking whether the DI is stored in a database associated with the system. If it's not stored in the database—initiating an application pre-installed on the WCD that sends a registration request to the system, during which DI is inputted into the database along with an application identifier (AI) associated with the DI, and acting as an address to which push-notifications corresponding to the WCD are sent. If DI is stored in the database, AI is retrieved therefrom. The proposed methods and systems provide for a possibility of identifying WCDs together with their geolocation in local zones.

9 Claims, No Drawings

METHOD FOR WIRELESS DEVICE LABELING AND MACHINE READABLE MEDIUM FOR IMPLEMENTATION THEREOF

CROSS-REFERENCE TO RELATED APPLICATIONS

This application is a U.S. national stage application of a PCT application PCT/RU2015/000007 filed on 14 Jan. 2015, whose disclosure is incorporated herein in its entirety by reference, which PCT application claims priority of a Russian Federation patent application RU2014101241 filed on 16 Jan. 2014.

FIELD OF THE INVENTION

This invention relates to wireless communications systems (in particular, radio communication); more specifically, the invention relates to systems and methods for identification of mobile device users. The system is intended mainly for distribution of advertising and information content in local areas, such as cinemas, restaurants, hotels, etc.

BACKGROUND OF THE INVENTION

There exists a system of sending push-notifications using the Google technology ("Analysis and Development of Push Notifications Using Technologies by Google Inc.", International Journal of Open Information Technologies, No. 3, 2013, pp. 20-24). The known technology uses a third party server (GCM server) to send pushes. Sending is performed according to an application identifier, and, even if the application is not active, the user receives this message as the application identifier (token) is registered at the data sending server and associated with a certain device identifier (sender).

When registering the application, the server saves the device and application identifiers in its database, and, if the registration is successful, informs the application server of the application identifier. To send a push notification, the application server transmits a sending request to the GCM server that sends the push notification to the device (if available) or, if not, stores the message for subsequent sending.

The known system contains an application server capable of sending requests for sending push notifications to the GCM server and a database with application identifiers. The known system was selected as the closest analog (prototype) of the present invention.

However, the technology, according to the prototype, doesn't allow sending push notifications mapped to a location of the sending device in local areas (e.g., in buildings, shopping centers, expo centers, stadiums, airports, etc.) to be used in systems similar to the one disclosed in the description of a RF Patent RU119549U1.

BRIEF SUMMARY OF THE INVENTION

The developers of the present invention faced a problem of ensuring unambiguous identification of a device user in case of inactive application in local areas. The problem becomes more complicated, as producers of many devices currently set restrictions and prohibitions for determination of a device identifier (MAC address) at the application level, and laws of many countries impose restrictions upon personal data collection. In order to solve this problem, a system for labeling radio communication devices, a method of radio communication device identification, and a system for radio communication device identification were developed.

The first feature of the present invention provides a method for labeling wireless network devices herein called 'device labeling' that includes the following stages:
providing a system comprising: a central server associated with a database; and a local server capable of transmitting data to and receiving data from the central server, and capable of transmitting network packets to the wireless network devices and receiving network packets from the wireless network devices;
pre-installation of an application on the wireless network devices;
receiving a network packet by the local server from a wireless network device of said wireless network devices, wherein the network packet contains a device identifier;
checking whether the database stores the device identifier;
if the device identifier is not stored in the database, then starting the application that transmits an activation request to the system using the corresponding wireless network device;
determining an application identifier by the system, wherein the application identifier is associated with the device identifier; and
storing the device identifier in the database.

The technical result of the first feature of the present invention is enabling the device labeling in local areas for its subsequent identification without needing the application to be started on the device.

For the purposes of this disclosure, a 'network packet' means a specifically encapsulated data block transmitted via the network in a batch mode.

The second feature of the present invention provides a method for device identification for sending push notifications to LAN devices that includes the following stages:
providing a system comprising: a central server associated with a database; and a local server capable of transmitting data to and receiving data from the central server, and capable of transmitting network packets to a plurality of LAN devices and receiving network packets from the plurality of the LAN devices;
the method comprises the steps of:
receiving a network packet by the local server from a LAN device of the plurality of the LAN devices, wherein the network packet contains a device identifier;
checking whether the database stores the device identifier;
if the device identifier is stored in the database, then determining by the system an application identifier associated with the device identifier received; and
according to the application identifier determined, sending a request for push notification to a service device capable of sending push notifications.

The technical result of the second feature of the present invention provides for the possibility to unambiguously identify devices situated in local areas.

According to the third feature of the present invention, a system for identification of devices connected to wireless networks in local areas to generate and send push notifications is developed that includes:
a central server containing a database; the database contains at least device identifiers and application identifiers associated with the device identifiers;
at least one local server designed to transmit data to the central server;

at least one data transmission channel between the central server and the at least one local server;

wherein:

the at least one local server is equipped with a wireless data transmission module capable to transmit data between the local server and wireless network devices and capable to receive network packets with the aforesaid device identifier from the corresponding wireless network device; and the system is capable to send data to a service device that is capable of sending push notifications to the wireless network devices according to the application identifier contained on the corresponding wireless network device.

The technical result of the third feature of the present invention enables identification of devices with reference to geolocation in local areas.

For the purpose of the present disclosure, local areas mean coverage areas of wireless communication networks complying with, e.g., IEEE 802.11 or IEEE 802.15.1 standard.

In this disclosure, the wireless device means any device designed to receive and send data via communication channels, at least one segment of which is made without cables.

The technical result of the disclosed solution consists of enabling unambiguous device identification in local areas.

DESCRIPTION OF PREFERRED EMBODIMENTS OF THE INVENTION

The present invention in its preferred embodiment is carried out using a system for identifying wireless network devices connected to wireless networks in local areas in order to generate and send push notifications.

The system includes: a central server containing a database. The database stores identifiers of wireless network devices (device identifiers) that have passed a registration essentially by the system, including device labeling. In the preferred embodiment, a hashed MAC address of the wireless network device or any other identifier unambiguously identifying the wireless network device can be used as the device identifier. In addition, the database on the central server stores identifiers of applications installed on the wireless network devices that have passed the registration essentially by the system, including the device labeling. The application identifiers in the database are associated with the device identifiers of the devices where they are installed (or were installed during the device labeling). A Token identifier used for push notifications addressing can also be used as the application identifier.

The system can be designed to send data to a service device capable of sending push notifications to the wireless network devices according to the application identifier contained on the wireless network device. Such option for data transfer, including a request for push notification sending, can be implemented both using a direct communication channel for data exchange between the central server and the service device, or between the local server and the service device, and indirectly, via other devices to which the system can send data. A device of such services as, e.g., APNS service (Apple Push Notification service) or Google Cloud Messaging Push Service can be used as the service device.

Besides, the system comprises at least one local server designed to exchange data with the central server. Such capability can be provided by equipping the local server with a network interface and connecting the local server and the central server to the Internet. Thus, the main data transmission channel between the local server and the central server is created. Additionally, the local server can contain a redundant network interface (e.g., 3g modem) providing for a redundant data transmission channel in case of failure of the main one.

The local server is equipped with a module for wireless data transfer between the local server and the wireless network devices. Wireless data transmission between the local server and the wireless network devices, in preferred embodiments, is performed according to IEEE 802.11 standard, or, in another preferred embodiment, IEEE 802.15.1 (Wi-Fi). Then, the wireless data transmission module is designed to receive a device identifier contained in a network packet sent from the wireless network device. In one embodiment, the network packet is transmitted during connection of the wireless network device to the local server using the wireless data transmission module. In this case, the network packet can contain a request for device connection to the wireless data transmission network. In this case, the device identifier is transmitted with the network packet. In another embodiment, the wireless data transmission module works in the Radio Frequency MONitor Mode receiving network packets transmitted via the wireless network by the wireless network devices situated in a local area and containing device identifiers.

Initially, the system registers a wireless network device (user) where the application is installed.

The wireless data transmission module receives the network packet containing the device identifier. Preferably, the wireless data transmission module is in the Radio Frequency MONitor mode and receives all network packets transferred via the corresponding wireless data transmission protocol, after which the wireless data transmission module determines the device identifier based on the network packets. When the wireless data transmission device with a MAC address is connected to the network, it is assigned an IP address. Upon network package reception, its IP is determined, then, based on the IP address and ARP table data, the device MAC address is determined that can be used as a device identifier (network identifier) that allows to unambiguously identify the wireless network device in the network.

Then, in a preferred embodiment of the present invention, a database search request for a specific device identifier among the registered ones is sent to the central server containing the database. In the preferred embodiment of the invention, MAC address is stored in the hashed form during transmission and storage for the purpose of non-disclosure of user personal data.

If the check has showed that a user device identifier is not stored in the database, it is registered, which involves the device labeling. In order to perform the registration, the following conditions should be met: the wireless network device is connected to the wireless network in this local area via the wireless data transmission module; the installed application should be started. For that, upon connection to the local area network, the user is offered to install the application on the device, after which it is registered (activated). A variant is possible, when the application is pre-installed; then the user is offered to register it immediately after connection to the network. The registration request can also be sent to the local server from the wireless network device, if the application is installed on the wireless network device and it contains instructions that, when executed, force the wireless network device to generate and send such request.

In the preferred embodiment, the registration involves the device labeling. The labeling involves determination of the application identifier. In the most preferred embodiment, an application token for push notifications, that serves as the address for sending the push notifications, is used as the application identifier. After the application identifier is determined, its value associated with the device identifier is recorded into the database and saved in it. In the preferred embodiment, the application identifier and device identifier are sent to the central server containing the database in order to record and store the application identifier associated with the device identifier.

If a database search for the device identifier showed that the device identifier is contained in the database, the identifier of the application (application identifier) installed on the device, to which the identifier belongs, is determined. For that, the application identifier associated with the device identifier is extracted from the database.

After the identifier (in the preferred variant: token identifier) of the application installed on the wireless network device is determined, it is possible to send a push notification to it. In the preferred variant, the sending is carried out by directing a request for sending the push notification by the central server to the service device designed to send push notifications. The content of the push notification, service device selection, as well as any other features of implementation of the present invention, can be selected depending on wireless device parameters, such as its model, operating system version, manufacturer. In order to make this selection, the device identification method and its labeling method under the present invention may include a stage when wireless device parameters are determined based on the identifier of the wireless network device. The push notification can contain information or advertising message, offer to start the application, link to a network resource, warning, etc.

Evidently, the stages of the method can be performed not only by the devices correspondingly specified in the present disclosure. A function of the methods under the present invention can be differently distributed between system devices. In the present invention, the embodiment of the invention is given which is the most optimal at the current state of the art.

Besides, the fourth, fifth, and sixth features of the present embodiment allow machine readable media to be disclosed that contain machine executed instructions, such that, when executed by a computer belonging to the system for identification of devices connected to wireless networks in local areas in order to generate and send push notifications, they force the system to carry out the disclosed methods.

The system for identification of wireless devices usually includes different machine readable media. Machine readable medium can represent any suitable medium that can be accessed by the system, and such medium can include both volatile and nonvolatile medium, as well as portable and non-portable medium. As an example but not limitation, the machine readable medium can contain a computer storage medium and communication environment. The computer storage medium includes both volatile and nonvolatile, portable and non-portable medium implemented by any method and any technology used for storing such information as machine readable instructions, software modules, and other data. The computer storage media include, without limitation, RAM, ROM, EEPROM, flash memory, or any other memory technology, CD-ROM, DVD, or any other optical storage devices, magnetic cassette, magnetic tape, magnetic disc drive, or other magnetic storage devices, or any other medium that can be used to store the required information and be accessed by the request processing system. Communication environment usually implements machine readable instructions, data structures, software modules, or other data in the modulated data signal, such as carrier signal or other transportation mechanism, and includes any information delivery environment. The term "modulated data signal" means a signal where one or several of its characteristics are set or change in such a way as to encode the information in this signal. As an example, but not an exception, the communication environment includes a wired environment, such as a wired network or direct connection, as well as a wireless environment, such as acoustic, radio frequency, infra-red, and other wireless environments. Combinations of any above mentioned media (environments) also should be considered as machine readable media.

The above discussed storages and associated computer storage environment media provide for storage of machine readable instructions, data structures, software modules, and other data for the request processing system.

The present invention is described in detail with reference to the preferred embodiments, but it is evident that it can be implemented in different embodiments without going beyond the scope of the claimed scope of legal protection defined by the patent claim.

Claims of the invention:

1. A method for labeling a plurality of wireless network devices including the steps of:
   providing a system comprising: a central server associated with a database; and a local server capable of transmitting data to and receiving data from the central server, and capable of transmitting network packets to said plurality of wireless network devices and receiving network packets from said plurality of wireless network devices;
   providing installation of an application on a wireless network device from said plurality of wireless network devices, capable of transmitting an activation request to the system by using said wireless network device;
   receiving a network packet by the local server from the network device, wherein the network packet contains a device identifier;
   checking whether the database stores the device identifier;
   determining that the device identifier is not stored in the database;
   in response to the determining, performing the following steps to provide said labeling:
      starting said application that transmits said activation request to the system using the wireless network device;
      determining an application identifier by the system, wherein the application identifier is associated with the device identifier; and
      storing the device identifier in the database.

2. The method according to claim 1, wherein said application identifier contains an address for sending push notifications.

3. The method according to claim 1, further including the steps of:
   transmitting the application identifier and the device identifier to the central server; and
   storing the application identifier in said database.

4. The method according to claim 3, wherein the device identifier is hashed before said step of transmitting the device identifier to the central server.

5. The method according to claim 1, wherein the device identifier is hashed before said step of transmitting the device identifier to the central server.

6. The method according to claim 1, further including the step of:
- transmitting the device identifier to the central server before said step of checking whether the database stores the device identifier.

7. The method according to claim 6, wherein the device identifier is hashed before said step of transmitting the device identifier to the central server.

8. A non-transitory computer readable medium storing instructions executable by a computer being part of a system for identifying a plurality of wireless network devices connected to wireless networks in local areas for generating and sending push notifications; said wireless networks are capable of transmitting network packets to said plurality of wireless network devices and receiving network packets from said plurality of wireless network devices; said system is associated with a database;
- wherein, upon executing said instructions by the computer, the system implements a method including the steps of:
  - providing installation of an application on a wireless network device from said plurality of wireless network devices; the application is capable of transmitting an activation request to the system by using said wireless network device;
  - receiving a network packet from the wireless network device, wherein the network packet contains a device identifier;
  - checking whether the database stores the device identifier;
  - determining that the device identifier is not stored in the database;
  - in response to the determining, performing the following steps to provide said labeling:
    - starting said application that transmits said activation request to the system using the wireless network device;
    - determining an application identifier by the system, wherein the application identifier is associated with the device identifier; and
    - storing the device identifier in the database.

9. A method for labeling a plurality of wireless network devices including the steps of:
- providing a system for identifying said plurality of wireless network devices connected to wireless networks in local areas for generating and sending push notifications; said wireless networks are capable of transmitting network packets to said plurality of wireless network devices and receiving network packets from said plurality of wireless network devices; said system is associated with a database;
- providing installation of an application on a wireless network device from said plurality of wireless network devices capable of transmitting an activation request to the system by using said wireless network device;
- receiving a network packet by the local server from the wireless network device, wherein the network packet contains a device identifier;
- checking whether the database stores the device identifier;
- determining that the device identifier is not stored in the database;
- in response to the determining, performing the following steps to provide said labeling:
  - starting said application that transmits said activation request to the system using the corresponding wireless network device;
  - determining an application identifier by the system, wherein the application identifier is associated with the device identifier; and
  - storing the device identifier in the database.

* * * * *